(12) United States Patent
Spiegel

(10) Patent No.: US 12,371,348 B2
(45) Date of Patent: Jul. 29, 2025

(54) SYSTEMS AND METHODS FOR CLEANING WATER FILTRATION SYSTEMS

(71) Applicant: Aqua Tru, LLC, Sherman Oaks, CA (US)

(72) Inventor: Peter G. Spiegel, Sherman Oaks, CA (US)

(73) Assignee: Aqua Tru, LLC, Sherman Oaks, CA (US)

( * ) Notice: Subject to any disclaimer, the term of this patent is extended or adjusted under 35 U.S.C. 154(b) by 133 days.

(21) Appl. No.: 16/244,275

(22) Filed: Jan. 10, 2019

(65) Prior Publication Data

US 2019/0218110 A1    Jul. 18, 2019

Related U.S. Application Data

(60) Provisional application No. 62/616,697, filed on Jan. 12, 2018.

(51) Int. Cl.
*C02F 1/00* (2023.01)
*C02F 1/28* (2023.01)
(Continued)

(52) U.S. Cl.
CPC .............. *C02F 1/006* (2013.01); *C02F 1/283* (2013.01); *C02F 1/42* (2013.01); *C02F 1/441* (2013.01);
(Continued)

(58) Field of Classification Search
CPC .. C02F 1/006; C02F 1/441; C02F 1/42; C02F 1/32; C02F 1/68; C02F 1/283; C02F 1/005; C02F 2201/005; C02F 2301/043; C02F 2301/046; C02F 2303/14; C02F 2307/06; C02F 9/005; C02F 1/003; C02F 1/001; C02F 2201/004; C02F 1/008; C02F 1/461; C02F 2307/10; C02F 1/043; C02F 1/18; C02F 1/20; C02F 1/28; C02F 1/78; C02F 2101/306; C02F 2101/322; C02F 2103/001; C02F 2103/007; C02F 2103/08;
(Continued)

(56) References Cited

U.S. PATENT DOCUMENTS 5,879,558 A    3/1999    Monroe et al.
5,976,363 A    11/1999    Monroe et al.
(Continued)

FOREIGN PATENT DOCUMENTS

CN    102824109 A    12/2012
CN    102933277 A    2/2013
(Continued)

OTHER PUBLICATIONS

WaterFilterShop, Reverse Osmosis Storage Tank Cleaning Tips, Sep. 16, 2016; p. 1-2 (Year: 2016).*
(Continued)

*Primary Examiner* — Hayden Brewster
(74) *Attorney, Agent, or Firm* — Eversheds Sutherland (US) LLP

(57) ABSTRACT

A water treatment system is disclosed. The water treatment system comprises a filter system, a filtered water tank in fluid communication with the filter system, and a water filtration cleaning system disposed between the filter system and the filtered water tank.

18 Claims, 5 Drawing Sheets

(51) Int. Cl.
*C02F 1/42* (2023.01)
*C02F 1/44* (2023.01)
*C02F 9/20* (2023.01)
*C02F 1/32* (2023.01)
*C02F 1/68* (2023.01)

(52) U.S. Cl.
CPC ............... *C02F 9/20* (2023.01); *C02F 1/32* (2013.01); *C02F 1/68* (2013.01); *C02F 2201/005* (2013.01); *C02F 2301/043* (2013.01); *C02F 2301/046* (2013.01); *C02F 2303/14* (2013.01); *C02F 2307/06* (2013.01)

(58) Field of Classification Search
CPC .......... C02F 2201/007; C02F 2209/005; C02F 2209/02; C02F 2209/03; C02F 2209/05; C02F 2209/40; C02F 2209/445; C02F 2303/04; C02F 2307/12; C02F 1/281; C02F 1/285; C02F 1/286; C02F 1/288; C02F 1/444; C02F 1/50; C02F 2101/12; C02F 2101/20; C02F 2101/305; C02F 2101/36; C02F 2201/006; C02F 2303/185; C02F 2307/02; C02F 2307/04; C02F 9/20; B01D 2311/04; B01D 2313/18; B01D 61/08; B01D 2311/2649; B01D 61/025; B01D 2311/06; B01D 61/12; B01D 2311/14; B01D 2311/2619; B01D 2311/2623; B01D 2311/2626; B01D 2311/2642; B01D 2311/2684; B01D 2313/13; B01D 2313/50; B01D 2317/02; B01D 2317/08; B01D 29/56; B01D 61/10; B01D 1/305; B01D 2313/246; B01D 61/04; B01D 2201/4023; B01D 2313/90; B01D 35/301; B01D 61/027; B01D 61/06; B01D 61/145; B01D 61/147; B01D 61/18; B01D 61/20; B01D 61/58; B01D 65/02; E03C 1/0411; E03C 1/044; E03C 1/055; E03C 2201/40; E03C 2201/45; E03F 9/00; F16K 11/022; Y02W 10/37; B01J 20/20; B01J 20/28004; B01J 20/28011; B01J 20/2803; B01J 20/28035; B01J 20/28057; B01J 20/28069; B01J 20/28083; C01B 32/05; C01P 2004/60; C01P 2006/12; F04B 7/0241; F04B 9/045; Y10T 137/3294; Y10T 137/87249; Y10T 137/9029; Y10T 137/9464; Y10T 137/9682
See application file for complete search history.

(56) References Cited

U.S. PATENT DOCUMENTS

| | | | | |
|---|---|---|---|---|
| 6,068,764 | A * | 5/2000 | Chau | B01D 61/06 210/136 |
| 9,422,173 | B1 * | 8/2016 | Spiegel | C02F 1/441 |
| 2003/0024568 | A1 * | 2/2003 | Bowman | B01D 61/10 137/217 |
| 2003/0147132 | A1 * | 8/2003 | Behnsen | C12M 41/36 359/398 |
| 2004/0118291 | A1 * | 6/2004 | Carhuff | A47J 31/469 99/275 |
| 2007/0125710 | A1 * | 6/2007 | Schmitt | B01D 61/10 210/652 |
| 2011/0180464 | A1 * | 7/2011 | Schmitt | C02F 1/441 210/86 |
| 2013/0062219 | A1 * | 3/2013 | Lee | B01D 61/12 205/742 |
| 2014/0048471 | A1 * | 2/2014 | Gaignet | B01D 29/62 210/409 |
| 2016/0053425 | A1 | 2/2016 | Wolff | |
| 2017/0028350 | A1 * | 2/2017 | Spiegel | B01D 61/08 |
| 2017/0028351 | A1 | 2/2017 | Spiegel et al. | |
| 2019/0031530 | A1 * | 1/2019 | Kitagawa | C02F 1/283 |
| 2019/0142987 | A1 * | 5/2019 | Zhang | C02F 1/32 250/435 |

FOREIGN PATENT DOCUMENTS

| | | |
|---|---|---|
| CN | 103657424 A | 3/2014 |
| CN | 206705870 U | 12/2017 |
| KR | 1020160105262 | 9/2016 |

OTHER PUBLICATIONS

International Search Report and Written Opinion, PCT/US19/012983, 6 pages, Apr. 29, 2019.
First Examination Report issued for related Indian Patent Application No. 202017029965 dated Apr. 3, 2022.
First Office Action issued for related Chinese Patent Application No. 201980018795.
Office Action of corresponding Korean Patent Application No. 10-2020-7023055 dated Jul. 7, 2023, including English translations.

* cited by examiner

SYSTEMS AND METHODS FOR CLEANING WATER FILTRATION SYSTEMS

CROSS-REFERENCE TO RELATED APPLICATIONS

The disclosure claims priority to and the benefit of U.S. provisional patent application No. 62/616,697, filed Jan. 12, 2018, which is hereby incorporated herein in its entirety.

FIELD OF THE DISCLOSURE

The disclosure generally relates to water filtration and more particularly relates to systems and methods for cleaning water filtration systems.

BACKGROUND

Due to increased levels of toxicity caused by chemicals found within the water supply, water filtration has become widespread within many homes. Point-of-use (POU) water treatment devices are designed to treat drinking water for use in the home. These devices can be attached to a faucet and/or installed under a sink. They differ from point-of-entry (POE) devices, which are installed on the water line as it enters the home and treats all the water in the building.

Many households today have reverse-osmosis (RO) units installed. These devices use a membrane that screens out chemicals, such as chloride and sulfate as well as most other contaminates found in the water supply. RO systems are generally multi-stage systems and include an activated charcoal filter since RO does not remove volatile organic compounds. A RO system can remove particles down to 1 Angstrom.

POU under the sink devices typically include a storage water tank. The water that is purifier is stored in this tank before it is dispense from a faucet typically mounted on a sink next to the hot and cold tap water faucet. Due to imperfections in the RO membrane, pinholes in the surface can appear or seals in the filtering systems might leak. The can cause silt, dissolved solids, VOC, and other contaminates to accumulate in the storage tank. Bacteria and viruses can also creep into the storage tank and start to grow inside the tank. Because of this, most manufacture of under the sink systems recommend a yearly maintenance procedure to sanitize the tank so it free of any deposits and germs. This includes adding bleach to the system. However, this is very difficult to do due to the unit being permanently plumbed in to the water supply. This process typically involves turning off the water and using special filter cartridges or removing tubing and manually injecting bleach into a tube using a syringe or other special tools.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Described below are embodiments of water filtration systems (as well as individual components of the water filtration systems). Methods of using the water filtration systems are also disclosed. In some instances, the water filtration systems may comprise an under the sink RO water filtration system that is plumed into a building's water supply. For example, the water filtration systems may include an RO device at least partially installed underneath a sink, with the tap water connection plumbed directly to the sink cold water supply line, and a waste water drain line connected directly to the sink drain, such as the p-trap. The water filtration systems may use a membrane to screen out chemicals, such as chloride and sulfate as well as most other contaminates found in the water supply. The water filtration systems may be used to filter any contaminates. In this manner, the water filtration systems may provide the technical advantage and/or solution of providing filtered water. Moreover, the water filtration systems may provide the technical advantage and/or solution of little to no waste water. These and other technical advantages and/or solutions will become apparent throughout the disclosure.

Figure 1:
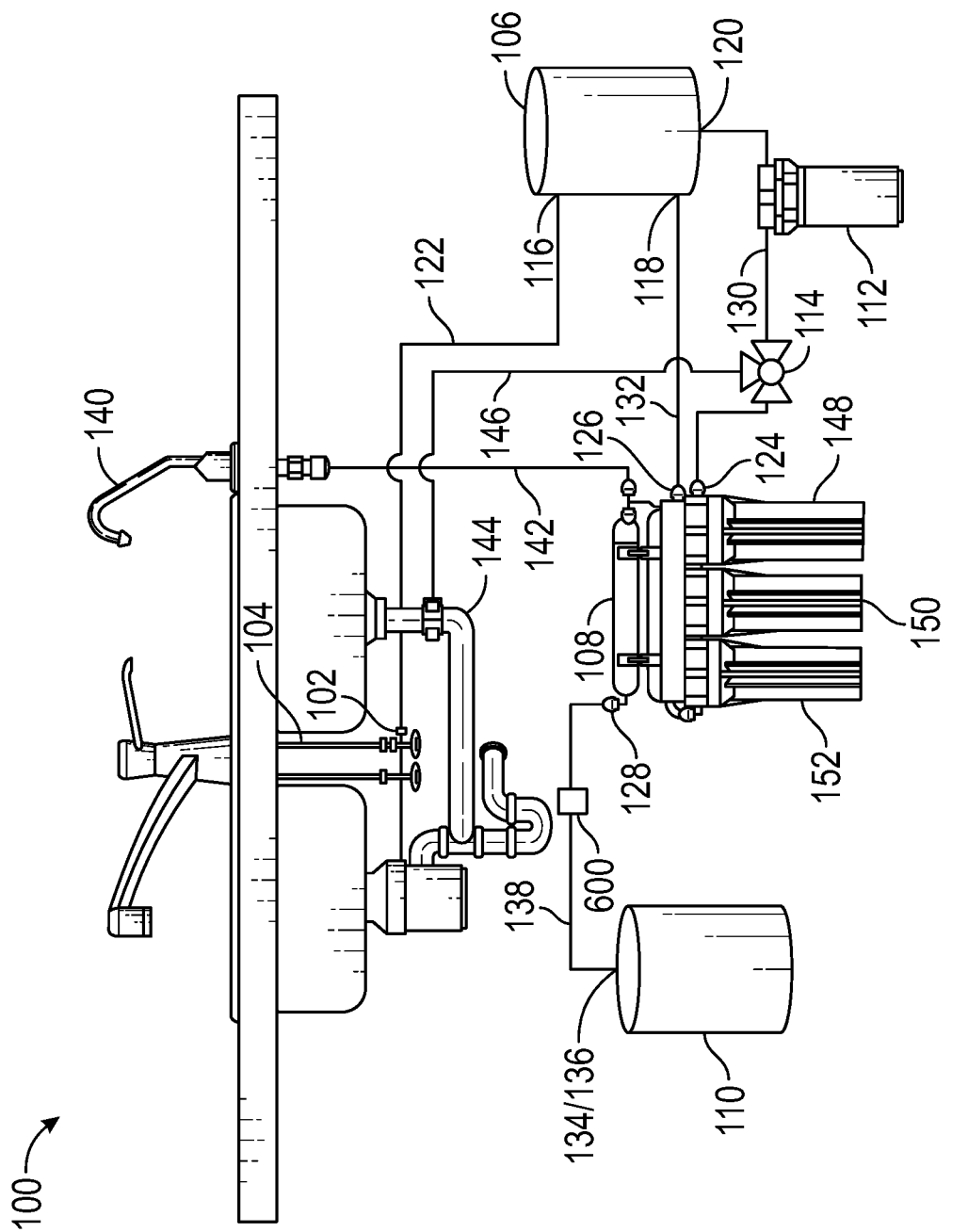
FIG. 1 schematically depicts a water filtration system in accordance with one or more embodiments of the disclosure.

In one embodiment, as depicted in FIG. 1, the water filtration system may include a reverse osmosis water treatment system 100. Any type of water filtration system may be used herein. The system 100 may include a source of water 102, such as tap water from a sink's cold water supply line 104. Any source of water 102 may be used herein. The system 100 also may include a water tank 106, a filter system 108, a filtered water tank 110, a pump 112, and a valve 114. The water tank 106 may include a first inlet 116, a second inlet 118, and an outlet 120. The first inlet 116 of the water tank 106 may be in fluid communication with the source of water 102 by way of a pipe 122. In this manner, the water tank 106 may store water therein.

The filter system 108 may comprise an inlet 124, a first outlet 126, and a second outlet 128. The inlet 124 of the filtration system 108 may be in fluid communication with the outlet 120 of the water tank 106 by way of a pipe 130. Also, the first outlet 126 of the filter system 108 may be in fluid communication with the second inlet 118 of the water tank 106 by way of a pipe 132. In this manner, the first outlet 126 of the filter system 108 may supply waste water from the filter system 108 to the water tank 106. As a result, the water tank 106 may include a mixture of water from the source of water 102 and waste water from the filter system 108.

The filtered water tank 110 may include an inlet 134 and an outlet 136. In some instances, the inlet 134 and the outlet 136 of the filtered water tank 110 may be one in the same, such as a two-way valve or the like. In other instances, the inlet 134 and the outlet 136 of the filtered water tank 110 may be separate components. The inlet 134 of the filtered water 110 tank may be in fluid communication with the second outlet 128 of the filter system 108 by way of a pipe 138. In this manner, the second outlet 128 of the filter system 108 may supply filtered water to the filtered water tank 110. In addition, the outlet 136 of the filtered water tank 110 may be in fluid communication with a faucet 140 by way of a pipe 142. In this manner, the outlet 136 of the filtered water tank 110 may supply the filtered water to the faucet 140.

The pump 112 may be disposed in fluid communication between the water tank 106 and the filter system 108 along the pipe 130. In addition, the valve 114 may be disposed in fluid communication between the pump 112 and the filter system 108 along the pipe 130. The valve 114 also may be in fluid communication with a drain 144 by way of a drain pipe 146. In some instances, the valve 114 may be a three-way valve or the like. The valve 114 may divert a first portion of water from the water tank 106 to the filter system by way of the pipe 130. In some instances, the first portion of water may comprise about 95% of the water that enters the valve 114. Moreover, the valve 114 may divert a second portion of water from the water tank 106 to the drain 144 by way of the drain pipe 146. In some instances, the second portion of water may comprise about 5% of the water that enters the valve 114. Any percentage of water may be supplied to the filter system 108 or diverted to the drain 144. In a preferred embodiment, the majority of the water in the system 100 is filtered, with a minimal amount of water being disposed of via the drain 144.

In some instances, the filter system 108 may comprise a first filter 148, a second filter 150, and a third filter 152. The first filter 148 may be configured to receive water from the inlet 124 of the filter system 108. The first filter 148 may filter the water and deliver a first filtered water to the second filter 150. The second filter 150 may be configured to receive the first filtered water from the first filter 148. The second filter 150 may bifurcate the first filtered water into a first portion and a second portion. The second filter 150 may be a reverse osmosis filter or the like. The first portion of the first filtered water may be supplied to the first outlet 126 of the filter system 108. In this manner, the first portion of the first filtered water may comprise the waste water that is delivered back to the water tank 106 via pipe 132. The second portion of the first filtered water may be supplied to the third filter 152. The third filter 152 may be configured to receive the filtered water from the second filter 150, to further filter the water, and to deliver the filtered water to the second outlet 128 of the filter system 108. In this manner, the second portion of the first filtered water, which is collectively filtered by the first filter 148, the second filter 150, and the third filter 152, comprises the filtered water that is supplied the filtered water tank 110 via pipe 138.

In certain embodiment, the first filter 148 may comprise a sediment filter, a carbon filter, a KDF filter, or a combination thereof. The second filter 150 may comprise a reverse osmosis membrane. The third filter 152 may comprises a carbon filter, an ion exchange filter, a remineralization element, or a combination thereof. In other instances, the third filter 152 may be omitted. In such instances, the second filter 150 may be configured to filter and deliver the second portion of the first filtered water to the filtered water tank 110. In yet other instances, additional filters may be disposed downstream of the third filter 150 before the filtered water tank 110. Any number, type, and/or combination of filters may be used herein.

In certain embodiments, 100% of the water that enters the first filter 148 may pass to the second filter 150. In other instances, less than 100% of the water that enters the second filter 150 passes to the third filter 152. For example, about 1% to about 30% of the water that enters the second filter 150 may pass to the third filter 152, with the remaining water constituting the waste water that is delivered back to the water tank 106 via pipe 132. In yet another embodiment, 100% of the water that enters the third filter 152 may pass to the filtered water tank 110 via pipe 138. Any percentage of water may enter the first filter 148, the second filter 150, or the third filter 152.

In operation, water is supplied to the water tank 106 from the water source 102 via pipe 122. The water source 102 may continually feed the water tank 106 as needed, leaving at least some space within the water tank 106 for waste water from the filter system 108. In some instances, a valve may be disposed along pipe 122 to control the flow of fluid to the water tank 106. The pump 112 may pump the mixture of source water and waste water from the water tank 106 into the valve 114. The valve 114 may then bifurcate a small portion of the water into the drain 144 and a majority of the water into the filtration system 108. In this manner, most of the water is filtered and supplied to the filtered water tank 110 to be dispensed by the faucet 140. A small portion of the waste water is recycled back to the water tank 106 by way of the pipe 132 to be mixed with the source water and the cycle continued.

The system 100 may include additional components and functionality. For example, the system 100 may include a UV treatment device, a heater, a chiller, and/or a carbonator. In addition, the system 100 may include devices capable of adding vitamins to the water and/or re-mineralizing the water. In certain embodiments, the system 100 may include a supply of electrical power, an electronic controller, and one or more sensors to monitor and control the dispensing of filtered water.

Figure 2:
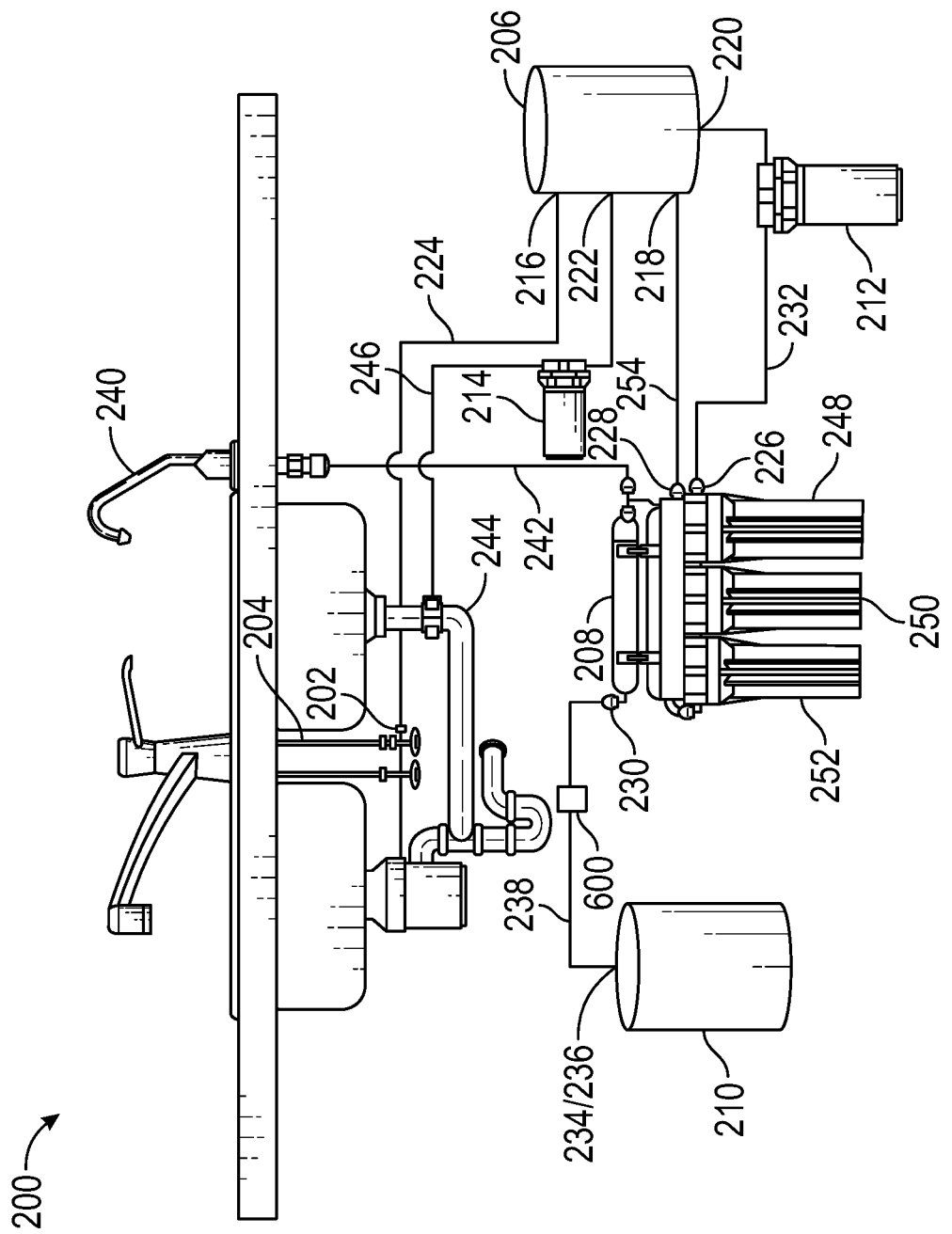
FIG. 2 schematically depicts a water filtration system in accordance with one or more embodiments of the disclosure.

FIG. 2 depicts an additional embodiment of a water filtration system comprising a reverse osmosis water treatment system 200. Any type of water filtration system may be used herein. The system 200 may include a source of water 202, such as tap water from a sink's cold water supply line 204. Any source of water 202 may be used herein. The system 200 also may include a water tank 206, a filter system 208, a filtered water tank 210, a first pump 212, and a second pump 214. The water tank 206 may include a first inlet 216, a second inlet 218, a first outlet 220, and a second outlet 222. The first inlet 216 of the water tank 206 may be in fluid communication with the source of water 202 by way of a pipe 224.

The filter system 208 may include an inlet 226, a first outlet 228, and a second outlet 230. The inlet 226 of the filtration system 208 may be in fluid communication with the first outlet 220 of the water tank 206 by way of a pipe 232. In addition, the first outlet 228 of the filter system 208 may be in fluid communication with the second inlet 218 of the water tank 206 by way of a pipe 254. In this manner, the first outlet 228 of the filter system 208 may supply waste water to the water tank 206 via pipe 254. As a result, the water tank 206 may comprise a mixture of water from the source of water 202 and waste water from the filter system 208.

The filtered water tank 210 may include an inlet 234 and an outlet 236. In some instances, the inlet 234 and the outlet 236 of the filtered water tank 210 may be one in the same, such as a two-way valve or the like. In other instances, the inlet 234 and the outlet 236 of the filtered water tank 210 may be separate components. The inlet 234 of the filtered water 210 tank may be in fluid communication with the second outlet 230 of the filter system 208 by way of a pipe 238. In this manner, the second outlet 230 of the filter system 208 may supply filtered water to the filtered water tank 210 via pipe 238. In addition, the outlet 236 of the filtered water tank 210 may be in fluid communication with a faucet 240 by way of a pipe 242. In this manner, the outlet 236 of the filtered water tank 210 may supply the filtered water to the faucet 240 via pipe 242.

The first pump 212 may be disposed in fluid communication between the water tank 206 and the filter system 208 along the pipe 232. The first pump 212 may facilitate flow between the water tank 206 and the filter system 208. The second pump 214 may be disposed in fluid communication between the water tank 206 and a drain 244. For example, the second outlet 222 of the water tank 206 may be in fluid communication with the second pump 214. The second pump 214 may be configured to supply a portion of the water from the water tank 206 to the drain 244 by way of a drain pipe 246.

In some instances, the filter system 208 may comprise a first filter 248, a second filter 250, and a third filter 252. The first filter 248 may be configured to receive water from the inlet 226 of the filter system 208. The first filter 248 may filter the water and deliver a first filtered water to the second filter 250. The second filter 250 may be configured to receive the first filtered water from the first filter 248. The second filter 250 may bifurcate the first filtered water into a first portion and a second portion. The second filter 250 may comprise a reverse osmosis filter or the like. The first portion of the first filtered water may be supplied to the first outlet 228 of the filter system 108. In this manner, the first portion of the first filtered water may comprise the waste water that is delivered back to the water tank 206 by way of the pipe 254. The second portion of the first filtered water may be supplied to the third filter 252. The third filter 252 may be configured to receive the filtered water from the second filter 250, to further filter the water, and to deliver the filtered water to the second outlet 230 of the filter system 208. In this manner, the second portion of the first filtered water, which is collectively filtered by the first filter 248, the second filter 250, and the third filter 252, comprises the filtered water that is supplied the filtered water tank 210 by way of the pipe 238.

In certain embodiment, the first filter 248 may comprise a sediment filter, a carbon filter, a KDF filter, or a combination thereof. The second filter 250 may comprise a reverse osmosis membrane. The third filter 250 may comprises a carbon filter, an ion exchange filter, a remineralization element, or a combination thereof. In other instances, the third filter 252 may be omitted. In such instances, the second filter 250 may be configured to filter and deliver the second portion of the first filtered water to the filtered water tank 210. In yet other instances, additional filters may be disposed downstream of the third filter 250 before the filtered water tank 210. Any number, type, and/or combination of filters may be used herein.

In certain embodiments, 100% of the water that enters the first filter 248 may pass to the second filter 250. In other instances, less than 100% of the water that enters the second filter 250 passes to the third filter 252. For example, about 1% to about 30% of the water that enters the second filter 250 may pass to the third filter 252, with the remaining water constituting the waste water that is delivered back to the water tank 206 via the pipe 254. In yet another embodiment, 100% of the water that enters the third filter 252 may pass to the filtered water tank 210 via the pipe 238. Any percentage of water may enter the first filter 248, the second filter 250, or the third filter 252.

In operation, water is supplied to the water tank 206 from the water source 202 via the pipe 224. The water source 202 may continually feed the water tank 206 as needed, leaving at least some space within the water tank 206 for waste water from the filter system 208. In some instances, a valve may be disposed along pipe 224 to control the flow of water to the water tank 206. The first pump 212 may pump the mixture of source water and waste water from the water tank 206 to the filter system 208. As discussed above, the filter system 208 may filter a portion of the water, which may be supplied to the filtered water tank 210 to be dispensed by the faucet 240. All of the waste water from the filter system 208 may be recycled back to the water tank 106 via the pipe 254 to be mixed with the source water and the cycle continued. The second pump 214 may empty a portion of the water from the water tank 206 to the drain 244 via the pipe 246.

The system 200 may include additional components and functionality. For example, the system 200 may include a UV treatment device, a heater, a chiller, and/or a carbonator. In addition, the system 200 may include devices capable of adding vitamins to the water and/or re-mineralizing the water. In certain embodiments, the system 200 may include a supply of electrical power, an electronic controller, and one or more sensors to monitor and control the dispensing of filtered water.

Figure 3:
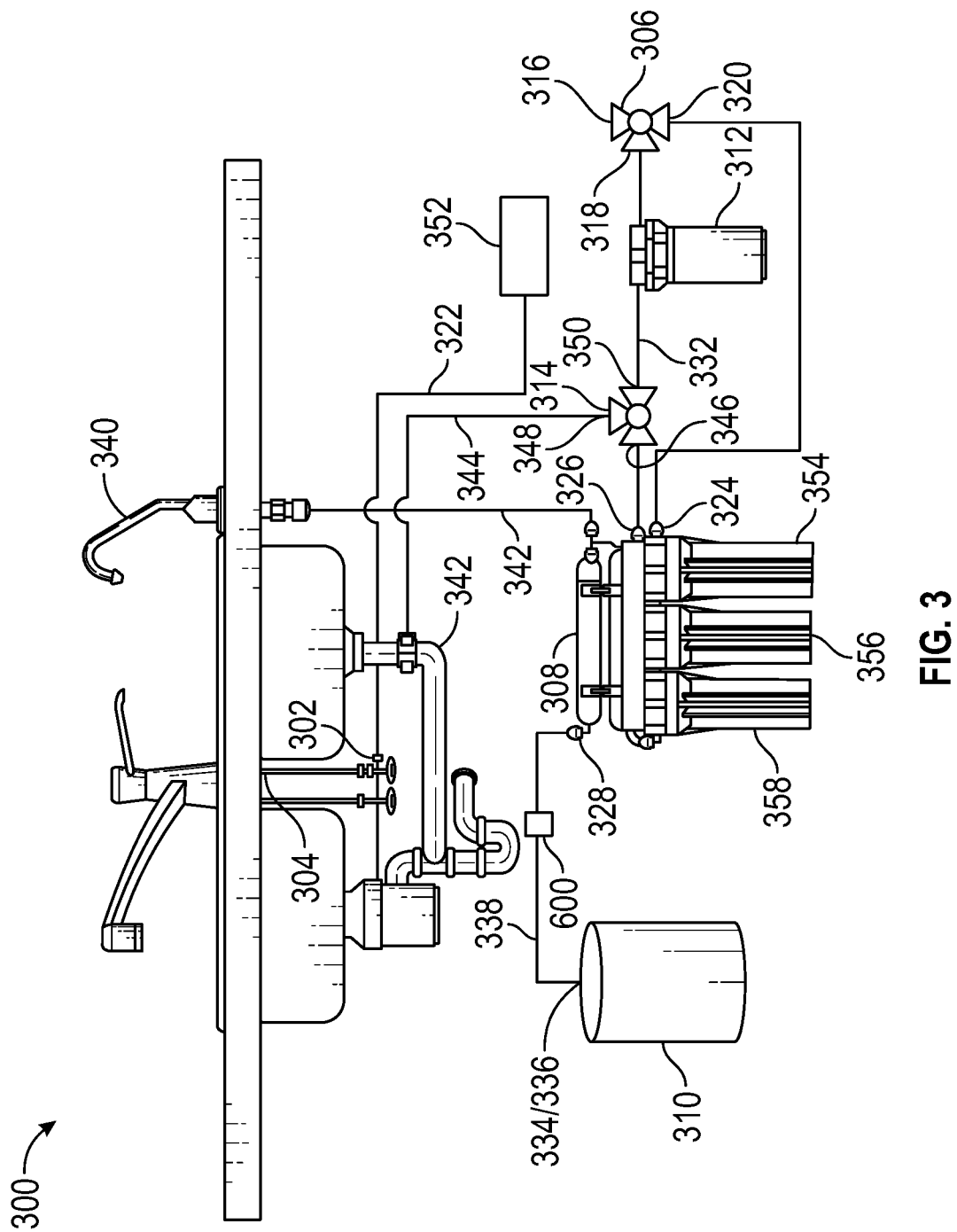
FIG. 3 schematically depicts a water filtration system in accordance with one or more embodiments of the disclosure.

FIG. 3 depicts an additional embodiment of a water filtration system comprising a reverse osmosis water treatment system 300. Any type of water filtration system may be used herein. The system 300 may include a source of water 302, such as tap water from a sink's cold water supply line 304. Any source of water 302 may be used herein. The system 300 also may include a first three-way valve 306, a filter system 308, a filtered water tank 310, a pump 312, and a second three-way valve 314. The first three-way valve 306 may include a first inlet 316, a second inlet 318, and an outlet 320. The first inlet 316 of the first three-way valve 306 may be in fluid communication with the source of water 302 by way of a pipe 322.

The filter system 308 may comprise an inlet 324, a first outlet 326, and a second outlet 328. The inlet 324 of the filtration system 308 may be in fluid communication with the outlet 320 of the first three-way valve 306 by way of a pipe 330. In addition, the first outlet 326 of the filter system 308 may be in fluid communication with the second inlet 318 of the first three-way valve 306 by way of a pipe 332. In this manner, the first outlet 326 of the filter system 308 may supply waste water from the filter system 308 to the first three-way valve 306. The first three-way valve 306 may mix water from the source of water 302 and waste water from the filter system 308. In some instances, the first three-way valve 306 may comprise a water tank or the like.

The filtered water tank 310 may include an inlet 334 and an outlet 336. In some instances, the inlet 334 and the outlet 336 of the filtered water tank 310 may be one in the same, such as a two-way valve or the like. In other instances, the inlet 334 and the outlet 336 of the filtered water tank 310 may be separate components. The inlet 334 of the filtered water 310 tank may be in fluid communication with the second outlet 328 of the filter system 308 by way of a pipe 338. In this manner, the second outlet 328 of the filter system 308 may supply filtered water to the filtered water tank 310 via the pipe 338. In addition, the outlet 336 of the filtered water tank 310 may be in fluid communication with a faucet 340 by way of a pipe 342. In this manner, the outlet 336 of the filtered water tank 310 may supply the filtered water to the faucet 340 via the pipe 342.

The pump 312 may be disposed in fluid communication between the first three-way valve 306 and the filter system 308 along the pipe 332. In addition, the second three-way valve 314 may be disposed in fluid communication between the first three-way valve 306 and the filter system 308 along the pipe 332. The second three-way valve 314 may be in fluid communication with a drain 342 by way of a drain pipe 344. The second three-way valve 314 may include a first inlet 346, a first outlet 348, and a second outlet 350. In this manner, the second three-way valve 314 may divert a first portion of water from the filter system 308 to the first three-way valve 306 by way of the second outlet 350. In some instances, the first portion of water may comprise about 75% of the water that enters the second three-way valve 314. Moreover, the second three-way valve 314 may divert a second portion of water from the filter system 308 to the drain 342 by way of the first outlet 348 and the pipe 344. In some instances, the second portion of water may comprise about 25% of the water that enters the second three-way valve 314. Any percentage of water may be supplied to the first three-way valve 306 or diverted to the drain 342. In this manner, the majority of the water in the system 300 is filtered, with a minimal amount of water being wasted.

In some instances, the system 300 may include a pressure reducer 352 disposed in fluid communication between the source of water 302 and the first three-way valve 306 along the pipe 322. The pressure reducer 352 may provide the source water 302 to the first three-way valve 306 at a suitable pressure, such as 80 PSI. Any pressure may be used herein.

In some instances, the filter system 308 may comprise a first filter 354, a second filter 356, and a third filter 358. The first filter 354 may be configured to receive water from the inlet 324 of the filter system 308. The first filter 354 may filter the water and deliver a first filtered water to the second filter 356. The second filter 356 may be configured to receive the first filtered water from the first filter 354. The second filter 356 may bifurcate the first filtered water into a first portion and a second portion. The second filter 356 may comprise a reverse osmosis filter to the like. The first portion of the first filtered water may be supplied to the first outlet 326 of the filter system 308. In this manner, the first portion of the first filtered water may comprise the waste water that is delivered back to the first three-way valve 306 by way of the pipe 332. The second portion of the first filtered water may be supplied to the third filter 358. The third filter 358 may be configured to receive the filtered water from the second filter 356, to further filter the water, and to deliver the filtered water to the second outlet 328 of the filter system 308. In this manner, the second portion of the first filtered water, which is collectively filtered by the first filter 248, the second filter 250, and the third filter 252, comprises the filtered water that is supplied the filtered water tank 310 by way of the pipe 338.

In certain embodiment, the first filter 354 may comprise a sediment filter, a carbon filter, a KDF filter, or a combination thereof. The second filter 356 may comprise a reverse osmosis membrane. The third filter 358 may comprises a carbon filter, an ion exchange filter, a remineralization element, or a combination thereof. In other instances, the third filter 358 may be omitted. In such instances, the second filter 356 may be configured to filter and deliver the second portion of the first filtered water to the filtered water tank 310. In yet other instances, additional filters may be disposed downstream of the third filter 358 before the filtered water tank 310. Any number, type, and/or combination of filters may be used herein.

In certain embodiments, 100% of the water that enters the first filter 354 may pass to the second filter 356. In other instances, less than 100% of the water that enters the second filter 356 passes to the third filter 358. For example, about 1% to about 30% of the water that enters the second filter 356 may pass to the third filter 358, with the remaining water constituting the waste water that is delivered back to the first three-way-valve 306 by way of the pipe 332. In yet another embodiment, 100% of the water that enters the third filter 358 may pass to the filtered water tank 310. Any percentage of water may enter the first filter 354, the second filter 356, or the third filter 358.

In operation, water is supplied to the first three-way-valve 306 from the water source 302 via the pipe 322. The pressure reducer 352 may provide the water to the first three-way-valve 306 at a suitable pressure. The water source 302 may continually feed the first three-way-valve 306 as needed. Waste water from the filter system 308 may mix with water from the water source 302 in the first three-way-valve 306. For example, as discussed above, the filter system 308 may filter a portion of the water, which may be supplied to the filtered water tank 310 to be dispensed by the faucet 340. A small portion of the waste water from the filter system 308 may be recycled back to the first three-way-valve 306 via the pipe 332 to be mixed with the source water and the cycle continued. The second three-way-valve 314 may divert a portion of the waste water from the filter system 308 to the drain 342 via the drain pipe 344.

The system 300 may include additional components and functionality. For example, the system 300 may include a UV treatment device, a heater, a chiller, and/or a carbonator. In addition, the system 300 may include devices capable of adding vitamins to the water and/or re-mineralizing the water. In certain embodiments, the system 300 may include a supply of electrical power, an electronic controller, and one or more sensors to monitor and control the dispensing of filtered water.

The water filtration systems in FIG. 1-3 may significantly reduce operation cost and the environmental impact of wasted water as compared to conventional RO systems. For example, the systems described in FIGS. 1-3 provide under the sink RO systems that waste less water than conventional RO systems. In some instances, a conventional RO system may waste 70% to 90% of the water processed. The present systems, however, may substantially reduce waste water to about 10% to 30%.

Figure 4:
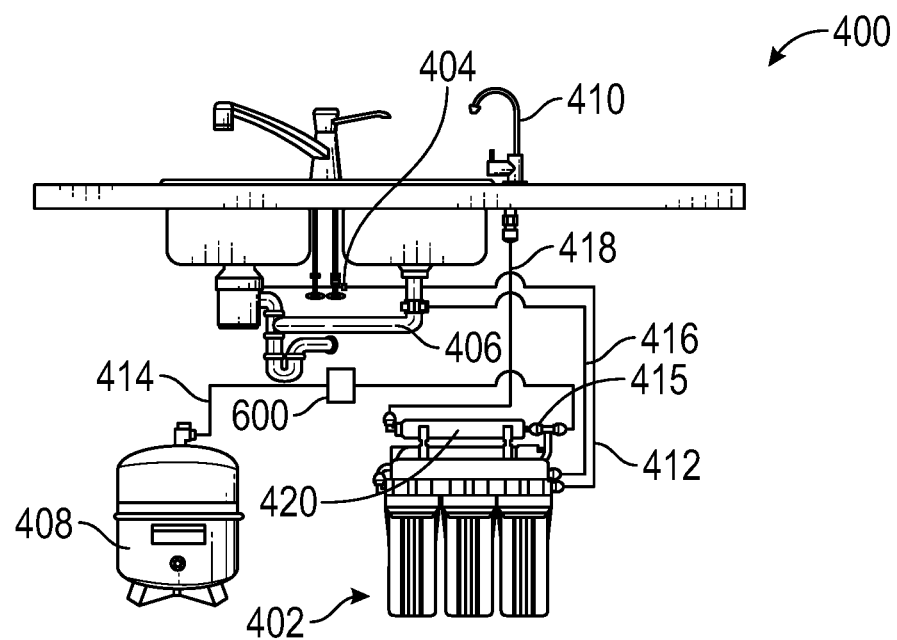
FIG. 4 schematically depicts a water filtration system in accordance with one or more embodiments of the disclosure.
Figure 5:
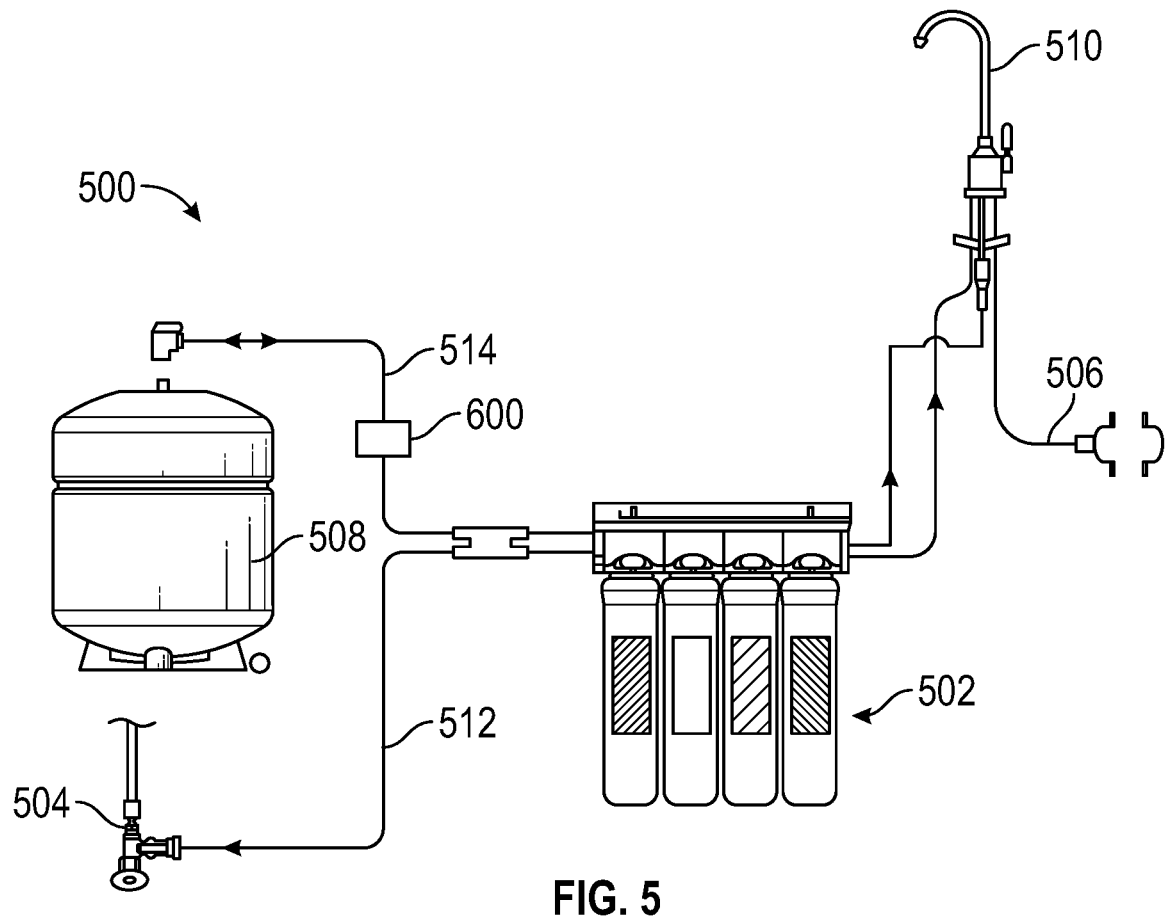
FIG. 5 schematically depicts a water filtration system in accordance with one or more embodiments of the disclosure.

FIGS. 4 and 5 depict additional embodiments of water filtration systems. FIG. 4 depicts a water filtration system 400 comprising a filter system 402 in fluid communication with a water supply 404, a drain 406, a clean water storage tank 408, and a faucet 410. The water filtration system 400 may operate in a similar manner as the embodiments shown in FIGS. 1-3. That is, the filter system 402 is supplied with water from the water supply 404 via the water line 412. A portion of the water is filtered within the filter system 402 and provided to the clean water storage tank 408 via a valve 415 (e.g., a three-way valve) and the water line 414. The filter system 402 may be any type of water filter system. In some instances, the filter system 402 is an RO filter system. In such instances, at least a portion of the water that enters the filter system 402 is supplied to the drain 406 via the water line 416. The clean water storage tank 408 supplies water to the faucet 410 via the water line 414, the valve 415, and the water line 418. In some instances, the water from the clean water storage tank 408 may pass back through at least a portion of the filter system 402 (e.g., a carbon filter 420) on to the faucet 410.

FIG. 5 depicts a water filtration system 500 comprising a filter system 502 in fluid communication with a water supply 504, a drain 506, a clean water storage tank 508, and a faucet 510. The water filtration system 500 may operate in a similar manner as the embodiments shown in FIGS. 1-4. That is, the filter system 502 is supplied with water from the water supply 504 via the water line 512. The water is filtered within the filter system 502 and provided to the clean water storage tank 508 via the water line 514. The filter system 502 may be any type of water filter system. In some instances, the filter system 502 is an RO filter system. In such instances, at least a portion of the water that enters the filter system 502 is supplied to the drain 506. The clean water storage tank 508 supplies water to the faucet 510 via the water line 514. In some instances, the water from the clean water storage tank 508 may pass back through at least a portion of the filter system 502 (e.g., a carbon filter) on to the faucet 510.

Figure 6:
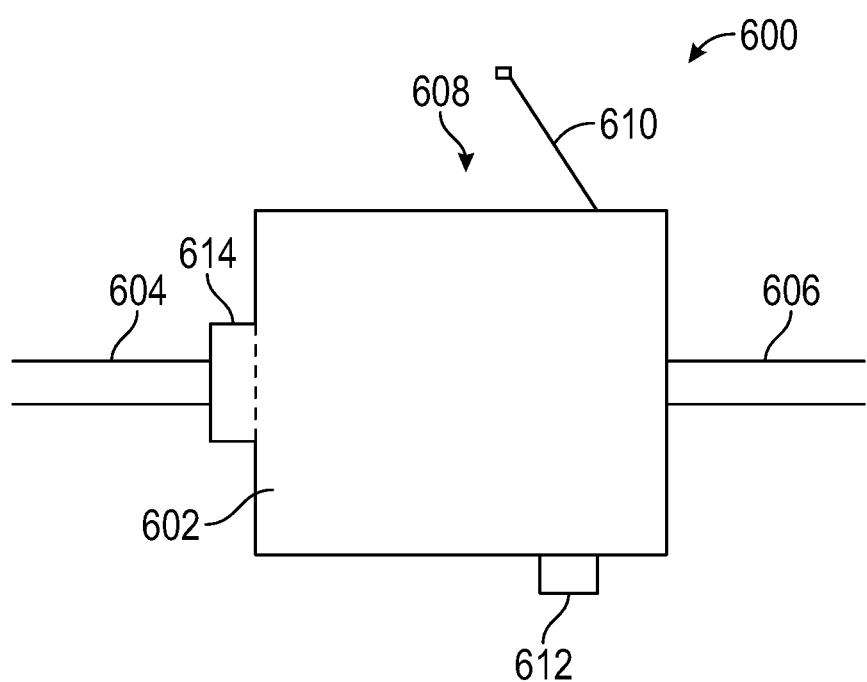
FIG. 6 schematically depicts a water filtration cleaning system in accordance with one or more embodiments of the disclosure.

FIG. 6 depicts a water filtration cleaning system 600. The water filtration cleaning system 600 may be used to clean a water filtration system with a cleaning solution. The water filtration cleaning system 600 may be incorporated into any water filtration system. For example, the water filtration cleaning system 600 may be incorporated into the water filtration systems depicted in FIGS. 1-5.

The water filtration cleaning system 600 may include a watertight vessel 602. The watertight vessel 602 may be any suitable size, shape, or configuration. The watertight vessel 602 may include an internal cavity with an inlet 604, an outlet 606, and a sealable opening 608. In some instances, the sealable opening 608 may comprise a pivoting access door 610 attached to the watertight vessel 602. The pivoting access door 610 may provide a watertight seal about the sealable opening 608. In other instances, the sealable opening 608 may comprise a "screw-in" plug, a pushed in freestanding insert, or a pushed in insert attached to the watertight vessel 602 with a hinge or other tether. In any case, the sealable opening 608 may provide access to the interior (i.e., the internal cavity) of the watertight vessel 602. The watertight vessel 602 also may include a drain port 612, which may also include a sealable opening or the like. For example, the drain port 612 may comprise pivoting door, a "screw-in" plug, a pushed in freestanding insert, or a pushed in insert attached to the vessel with a hinge or other tether. In any case, the drain port 612 may be sealed shut or opened to enable egress of fluid within the water tight vessel 602.

In certain embodiments, as depicted in FIG. 4, the water filtration cleaning system 600 may be disposed along the water line 414 between the filter system 402 and the clean water storage tank 408. That is, the inlet 604 of the watertight vessel 602 may be in fluid communication with the filter system 402. For example, the inlet 604 of the watertight vessel 602 may be connected to a final filter in a water purifier system (including but not limited to reverse osmosis, ultra-filtration, etc.) of the filter system 402. The outlet 606 of the watertight vessel 602 may be in fluid communication with a storage tank. For example, the outlet 606 of the watertight vessel 602 may be connected to the clean water storage tank 408. The inlet 604 and the outlet 606 are relative depending on the flow through the water filtration cleaning system 600.

In this manner, the watertight vessel 602 can be opened via the pivoting door 610 to add a sanitizing agent through the sealable opening 608 in liquid or powdered form within the watertight vessel 602 to clean or sterilize the storage tank and/or the conduits connected thereto. In some instances, to further facilitate the cleaning of the storage tank, a shut off valve 614 may be disposed about the inlet 604 of the watertight vessel 602. For example, the water filtration cleaning system 600 may be disposed on a bypass line connected to the water line 414. In this manner, one or more valves disposed on either side of the water filtration cleaning system 600 along the bypass line may be opened or closed to provide fluid communication with the water filtration cleaning system 600.

In certain embodiments, as depicted in FIG. 5, the water filtration cleaning system 600 may be disposed along the water line 514 between the purified water exit of an integrated water purifier system 502 (including but not limited to reverse osmosis, ultra-filtration, etc.) and the storage tank 508. That is, the inlet 604 of the watertight vessel 602 may be in fluid communication with the filter system 502, and the outlet 606 of the watertight vessel 602 may be in fluid communication with the storage tank 508. For example, the outlet 606 of the watertight vessel 602 may be connected to the clean water storage tank 508. In some instances, the water filtration cleaning system 600 may be disposed on a bypass line connected to the water line 514. In this manner, one or more valves disposed on either side of the water filtration cleaning system 600 along the bypass line may be opened or closed to provide fluid communication with the water filtration cleaning system 600.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
   a water filter system;
   a filtered water tank in fluid communication with the water filter system; and
   a water filtration cleaning system disposed about a combined inlet and outlet of the filtered water tank, wherein the water filtration cleaning system comprises a watertight vessel having a sealable opening configured to receive a sanitizing agent to clean or sterilize the filtered water tank.

2. The system of claim 1, wherein the water filtration cleaning system comprises:
   an inlet of the watertight vessel in fluid communication with the water filter system; and
   an outlet of the watertight vessel in fluid communication with the filtered water tank.

3. The system of claim 2, wherein the sealable opening comprises an access door attached to the watertight vessel.

4. The system of claim 3, wherein the access door is configured to provide a watertight seal about the sealable opening in a closed position and access to an interior of the watertight vessel in an open position.

5. The system of claim 2, wherein the water filtration cleaning system comprises a drain port disposed about the watertight vessel, wherein the drain port comprises a sealable opening configured to seal off or provide egress of fluid within the water tight vessel.

6. The system of claim 2, wherein the water filter system comprises a multi stage filter system comprising a number of filters disposed in series, and wherein the inlet is connected to a final filter in the water filter system.

7. The system of claim 2, wherein the water filter system comprises an integrated water purifier system, and wherein the inlet is connected to an exit of the integrated water purifier system.

8. A system, comprising:
 a water filter system comprising an RO filter;
 a filtered water tank in fluid communication with the water filter system; and
 a water filtration cleaning system disposed about a combined inlet and outlet of the filtered water tank, wherein the water filtration cleaning system comprises a watertight vessel having a sealable opening configured to receive a sanitizing agent to clean or sterilize the filtered water tank.

9. The system of claim 8, wherein the water filtration cleaning system comprises:
 an inlet of the watertight vessel in fluid communication with the water filter system; and
 an outlet of the watertight vessel in fluid communication with the filtered water tank.

10. The system of claim 9, wherein the sealable opening comprises an access door attached to the watertight vessel.

11. The system of claim 10, wherein the access door is configured to provide a watertight seal about the sealable opening in a closed position and access to an interior of the watertight vessel in an open position.

12. The system of claim 9, wherein the water filtration cleaning system comprises a drain port disposed about the watertight vessel, wherein the drain port comprises a sealable opening configured to seal off or provide egress of fluid within the water tight vessel.

13. The system of claim 9, wherein the water filter system comprises a multi stage filter system comprising a number of filters disposed in series, and wherein the inlet is connected to a final filter in the water filter system.

14. The system of claim 9, wherein the water filter system comprises an integrated water purifier system, and wherein the inlet is connected to an exit of the integrated water purifier system.

15. A method, comprising:
 positioning a water filtration cleaning system between a water filter system and a filtered water tank,
 wherein the water filtration cleaning system comprises:
  a watertight vessel comprising a sealable opening configured to receive a sanitizing agent to clean or sterilize the filtered water tank; and
 receiving, by the watertight vessel, the sanitizing agent to clean or sterilize the filtered water tank.

16. The method of claim 15, wherein the sealable opening comprises an access door attached to the watertight vessel.

17. The method of claim 16, wherein the access door is configured to provide a watertight seal about the sealable opening in a closed position and access to an interior of the watertight vessel in an open position.

18. The method of claim 17, further comprising:
 opening the access door;
 inserting, through the sealable opening, the sanitizing agent into the watertight vessel; and
 closing, after inserting the sanitizing agent into the watertight vessel, the access door.

* * * * *